United States Patent [19]

Cooper

[11] Patent Number: 5,508,736
[45] Date of Patent: Apr. 16, 1996

[54] VIDEO SIGNAL PROCESSING APPARATUS FOR PRODUCING A COMPOSITE SIGNAL FOR SIMULTANEOUS DISPLAY OF DATA AND VIDEO INFORMATION

[76] Inventor: Roger D. Cooper, Roatan Tower Court, Lubenham Market Harborough Leciester LE16 954, United Kingdom

[21] Appl. No.: 482,966

[22] Filed: Jun. 15, 1995

Related U.S. Application Data

[63] Continuation of Ser. No. 62,075, May 14, 1993, abandoned.

[51] Int. Cl.⁶ .................................................. H04N 7/18
[52] U.S. Cl. .......................... 348/144; 348/148; 348/467; 348/563; 348/589
[58] Field of Search .................................... 348/115, 143, 348/144, 148, 150, 461, 467, 553, 563, 589

[56] References Cited

U.S. PATENT DOCUMENTS

| | | | |
|---|---|---|---|
| 4,205,343 | 5/1980 | Barrett | 358/147 |
| 4,267,562 | 5/1981 | Raimondi | 358/109 |
| 4,814,896 | 5/1984 | Heitzman et al. | 348/115 |
| 5,045,937 | 9/1991 | Myrich | 358/109 |
| 5,258,837 | 11/1993 | Gormley | 358/140 |
| 5,267,042 | 11/1993 | Tsuchiya et al. | 358/209 |

Primary Examiner—Victor R. Kostak
Assistant Examiner—Nathan J. Flynn
Attorney, Agent, or Firm—Gifford, Krass, Groh, Sprinkle, Patmore, Anderson & Citkowski

[57] ABSTRACT

Video signal processing apparatus comprises means for generating data signals representing the physical status of a video camera with respect to a fixed frame of reference, the physical status being the position, orientation, height, altitude or speed, means for receiving video signals from the said camera and means for combining the said data signals with the said video signals whereby to produce a composite signal by which the data information and the video information contained in the video signals can be displayed simultaneously, and means for transmitting the combined signal to a remote location or means for recording the composite signal.

18 Claims, 1 Drawing Sheet

VIDEO SIGNAL PROCESSING APPARATUS FOR PRODUCING A COMPOSITE SIGNAL FOR SIMULTANEOUS DISPLAY OF DATA AND VIDEO INFORMATION

This is a continuation of application Ser. No. 08/062,075, filed on May 14, 1993, now abandoned.

BACKGROUND OF THE INVENTION

The present invention relates generally to video signal processing apparatus, and particularly to apparatus adapted for use in association with, or for incorporation into, a video camera used for generating video signals which are to be recorded or broadcast for surveillance purposes.

It is known to use video cameras for recording or transmitting events occurring at a remote location. For example video recordings of high security environments are frequently made as a deterrent or for use as a tool in subsequent detection of intruders. It is significant to note, however, that video recordings do not constitute admissible evidence for legal proceedings unless the time and date information is superimposed on the recording at the time. Apparatus for incorporating such data superimposition is known. Where more sophisticated surveillance pictures are taken, for example from moving vehicles such as aircraft, balloons, marine craft or the like, however, there is no currently available integrated equipment which can provide any more sophisticated data superimposition than merely the time and place.

The present invention is based on the realization that the interpretation of video pictures taken from a moving vehicle can be materially enhanced by the provision of additional data information concerning the vehicle or the camera carried thereby. For example, remote surveillance pictures require for their full interpretation data on a vehicle position which is usually supplied separately from the video recording and which, therefore, necessitates a separate operation in synchronization or matching of the recorded position information with that of the television pictures. This clearly leads to the possibility of errors introduced in effecting such synchronization. In addition, however, information concerning the altitude of the vehicle at the time the pictures are being taken, its speed, heading, altitude and other relevant information may also significantly assist the interpretation of the video recording and, furthermore, materially enhance its value as legal evidence should this be required, or merely as information if this is the purpose of the surveillance. It is believed that marine and airborne reconnaissance operations monitoring vehicle movements for a plurality of reasons such as fisheries protection, information gathering for emergency services, guarding against smuggling of drugs or other contraband items could be materially improved by the direct provision of position information and/or altitude information and/or other motion data generated at the time the video signals are produced regardless of whether they are recorded or transmitted for direct viewing. It is important, however, that the additional data signals carried in association with the video signals should not result in any degradation of the quality of the pictures generated upon display of the signals since clearly this would be a retrograde step. However, there is at present no equipment capable of producing a displayable combined video picture and position or altitude data signal. No prior apparatus is known to the inventors in which picture information generated by a video camera is combined with data information concerning the position, altitude and movement of the camera without permanently obscuring the televised picture.

OBJECTS OF THE INVENTION

One object of the present invention is to provide apparatus for use in association with a video camera by which the video signals generated by the camera can be combined with data signals generated by other equipment, particularly position-determining equipment and other sensors for generating signals indicative of the altitude and/or motion of the vehicle on which the camera is mounted.

Another object of the invention is to provide a video camera having means for generating data signals representing the physical position of the camera and means for combining, such data signals with the camera's video signals for display.

SUMMARY OF THE INVENTION

According to one aspect of the present invention, therefore, signal processing apparatus comprises means for generating data signals representing the physical status of a video camera with respect to a fixed frame of reference, means for receiving video signals from the said camera, and means for combining the said data signals with the said video signals whereby to produce a composite signal by which the data information and the video information contained in the video signals can be displayed simultaneously, with the video information being substantially unaffected by the incorporation of the data signals.

As used herein the term "physical status" will be understood to mean the position and/or motion parameters of an object, including if appropriate the orientation or altitude, height, heading and speed. The present invention is particularly valuable for cameras or camera systems operating in the infra-red region of the spectrum since there is often no clearly identifiable visual information which may identify the source location.

The composite signal generated may be recorded or may be transmitted for reception by appropriate equipment at a remote location.

Preferably the said data signals are digitally encrypted and incorporated in the video signal using the vertical retrace interval.

The position signals may be derived from any known form of proprietary or other navigation positioning equipment, including (but not exclusively) inertial navigation systems, hyperbolic navigation radio beacons Loran-C, Decca Navigator or the satellite GPS (Global Positioning Satellite) System which is currently being set up. Accordingly, therefore, the means for determining the camera position information preferably includes a broadcast navigation signal receiver and decoder.

The said means for combining the said data signals with the said video signals to produce the said composite signal preferably includes a microprocessor programmed to assemble data signals representing the position, altitude and motion parameters of the camera systematically in a predetermined order prior to incorporation of the said data signals with the said video signals.

The said means for combining the said data signals with the said video signals also preferably includes digitizing means operable to digitize the said data signals prior to encryption thereof.

In order to display the encrypted composite signal with the data information overlaid over the picture content a suitable corresponding decoder and signal processor is required.

According to another aspect of the present invention a video camera for tele-surveillance purposes includes means for generating data signals representing the physical status (as hereinabove defined) of the camera with respect to a fixed frame of reference, and means for combining the said data signals with the video signals produced by the camera in such a way that the video information is substantially unaffected by the data signals.

Such a self-contained video camera may include all the sensors required to generate the selected data signals, such as accelerometers, altitude sensors, air speed indicators and navigation positioning equipment. Such a sophisticated data/video camera may then be used in a number of different locations and/or vehicles without requiring to be permanently installed in the location of vehicle as will be the case if a conventional camera is connected up to an array of separate sensors with which the vehicle may be provided for conventional purposes.

Such a camera may further include means for generating date and time signals and means for incorporating these latter with the said data signals in the said video signal produced by the camera.

The present invention also comprehends a receiver or play back apparatus for use in association with the signal processing apparatus defined hereinabove or with the signal processing camera referred to above, the receiver or play back apparatus having decoder means operable to extract the data signal information from the said composite signal and to present it for display as a visual overlay to the video picture information.

The apparatus of the present invention may be put into practice using PC text and video editing software combined with dedicated hardware designed specifically for the purpose. In particular, the transfer of information signals between the various units of the equipment may typically employ a common data transfer protocol (ideally one specified as a standard by the National Marine Electronic Association) allowing certain items of navigation equipment which already adopt such standards to be interfaced directly with the other components of the apparatus. Alternatively, of course, any other suitable protocol such as RS232 (at any selected BAUD rate) may be used.

BRIEF DESCRIPTION OF THE DRAWINGS

One embodiment of the present invention will now be described in more detail with reference to FIGURE 1, which is a block schematic diagram illustrating the major components of the signal processing apparatus of the invention.

DESCRIPTION OF THE PREFERRED EMBODIMENTS

Figure 1:
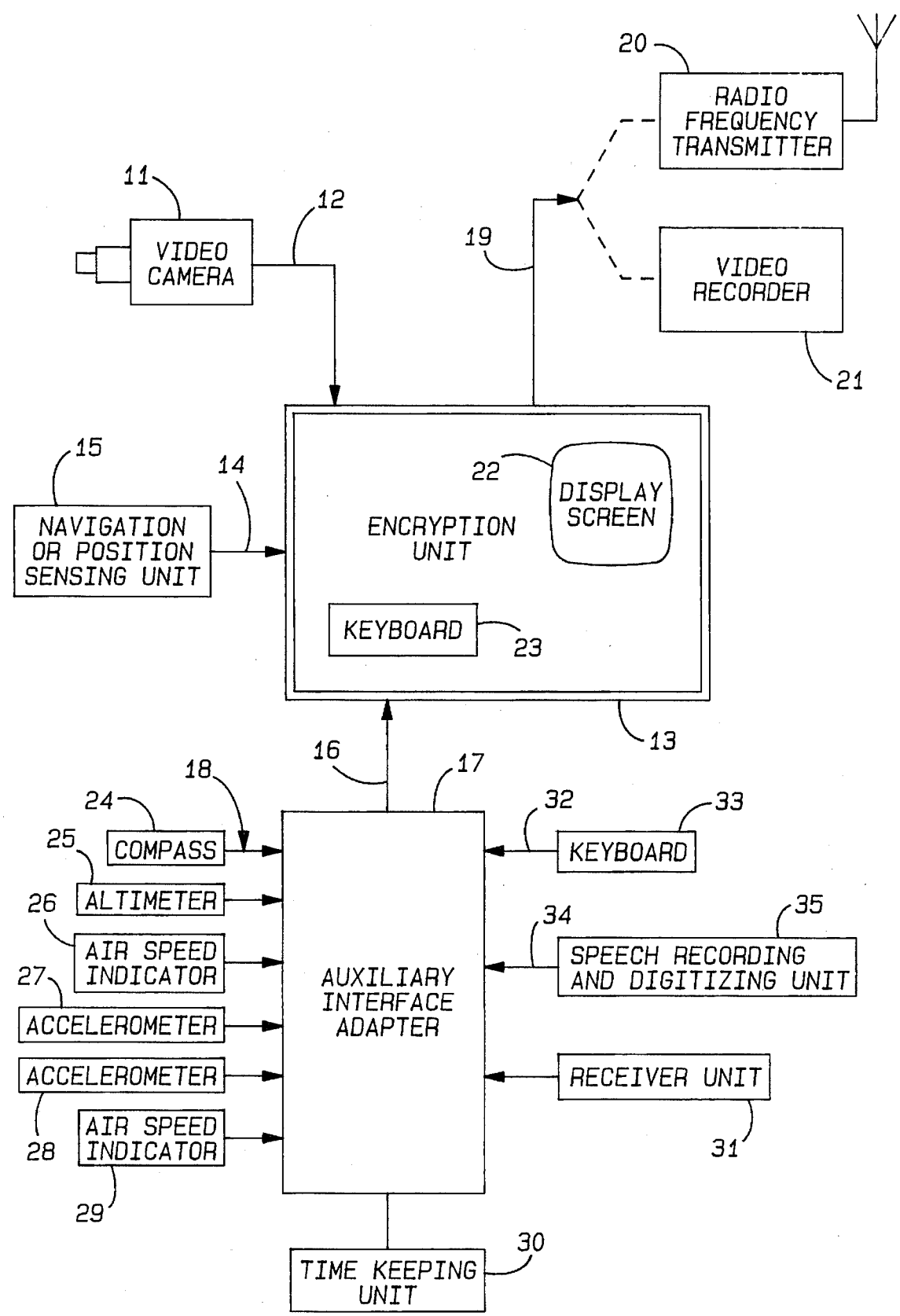

Referring to the drawings the apparatus broadly illustrated there comprises a conventional video camera generally indicated 11, which can be positioned in a vehicle (not shown) to produce video information signals on an output line 12 which leads to an encryption unit generally indicated 13 and the details of which will be described in more detail hereinbelow. The encryption unit 13 also receives positioning signals on an input line 14 from a navigation or position sensing unit 15 which, as mentioned above, may be a conventional unit operating on any of the radio navigation systems currently available (or to become available) such as the Global Positioning Satellite System (GPS) or hyperbolic navigation radio beacons Decca or Loran-C, or an inertial navigation system.

A further input line 16 to the encryption unit 13 leads from an auxiliary interface adapter 17 which in turn receives a plurality of input signals from individual sensors on the vehicle. The sensor input lines are generally indicated by the reference numeral 18, and are connected to respective sensors recording the vehicle heading, altitude, speed (either ground speed or air speed) and altitude information from accelerometers or other vehicle sensors together with any other data signals which an individual user may require: in particular, the sensors comprise a compass 24 the output signal from which is a heading signal, an altimeter 25 the output signal from which is an altitude signal, and an air speed indicator 26 the output signal from which is an air speed signal. This latter may be combined in the unit 17 with information concerning wind speed and direction to generate a ground speed signal: this obviously will also take into account the heading signal from the compass 24. These accelerometers 27, 28, 29 positioned to sense acceleration in mutually orthogonal directions provide output signals which, combined, indicate the altitude of the vehicle. Additional data signals may include time and date from a separate time keeping unit 30, and the interpretation of the video signals may be further facilitated by meteorological information identifying such things as cloud cover, precipitation etc which may be of value in assisting a user to interpret the pictures when they are displayed. Such information may be received on a receiver unit 31 for picking up broadcast information.

If the system is used on commercial aircraft then use may be made of the aircraft's own existing navigation equipment from which to draw data signals. In addition the user may be provided with an additional input line 32 on which data may be supplied for example via a keyboard 33 and an audio tunnel 34 for carrying digitized speech signals from a speech recording and digitizing unit 35. In this way an observer's comments made at the time of recording or broadcast may also be included with the altitude and navigation data. For example in remote inspection techniques the observer might wish to enter information known to him or observable with the naked eye which does not appear on the television picture, such as the part number of an item of equipment being inspected in the field, known to the observer but not visible, or perhaps information below the level of satisfactory resolution in the reproduced image, but which will influence the interpretation of the displayed image.

The encryption unit 13 incorporates a dedicated microcontroller device having a high degree of integration to minimize the need for peripheral devices, thereby reducing costs, printed circuit board area and component density whilst increasing reliability. The microcontroller device is operated by software programme which controls the processor to interrogate the input signal lines 18, 32, 34 via the auxiliary interface adapter 17, assemble the information signals found on these signal lines in a predetermined order, and incorporate the data information into the video signal arriving on the line 12, for example by using the vertical interval by a method similar in principle to teletext encryption. As is known, lines eighteen and nineteen of the television raster scan are reserved for teletext signals: it may be preferred to use these lines for the data if they are available, that is if they are not already occupied with teletext. For this purpose the system may be adaptive in the sense that it first looks at lines eighteen and nineteen to establish if they are free and, if not, seeks out other free lines at the beginning of the frame, thereby avoiding corrupting any data which may already be contained in the video signal.

The system checks for the existence of data information on a line under examination by testing the analogue signal level. As is known a blank line results in a screen display at the black level. The system therefore samples the line of interest to see if there is any signal above the black level and then conducts a statistical analysis to establish if the signal level detected is sufficient to indicate that there is data information on the line. If this analysis shows that there is no data information on the line the system encodes the altitude and navigation (and other) data onto that line (or those lines in the case of plural line tests), whereas if the statistical analysis shows that there is already data information on the line or lines under test then it passes on to an investigation of other suitable lines onto which the data may be encoded. Such a system does of course need some means by which the location of the altitude and navigation information can be flagged, for example recognizable check bits at the beginning of the lines in use for such data. A technique to include in the data address preamble such that, on decoding, the line number identified is double checked with the line number in the data block.

The output signal from the encryption unit is transmitted along an output line 19 either to a radio frequency transmitter 20 or to a video recorder 21 (or both) and the branched broken line extension of the output line 19 indicates the alternative possibilities.

The normal television standards may be adopted for the video signal, that is the 625 line by 50 Hertz standard for the PAL system or the 525 line 60 Hertz standard used for NTSC transmissions. Subsequent encryption of satellite TV signals may also be considered for digital encrypted video such as the DMAC-2 system or one of its derivatives. In order to accommodate the normal television standards a band width of 5.5 Megahertz must be accommodated in the circuits which supplement or use the video signal in any part of the processing system.

To accommodate the variation of the line frequency or field frequency of recorded video signals caused by the mechanical recording means common to most video recording systems, including VHS, BETAMAX, Video 8, Hi-Band, Umatic, a technique is employed to phase-lock the encoding and decoding data processing clock. This technique accommodates the recorded video signal and maintains the data processing clock synchronized with it. At each lined period a phase-lock oscillator is resynchronized to the in coming video signal and the micro processor system clock is also synchronized to this oscillator.

Unconventionally, the micro-processor operating routines are structured so as to be totally driven by the incoming video signal synchronization. For this purpose all software sub-routines are synchronously implemented at an upper harmonic of the video line or frame frequency applied to the data processing. It is envisaged that there may be some situations where there is no available video camera signal or other video input signal, in which case an internal television line or field generator may be employed to provide the necessary synchronization signal so that television-like signals can be used simply for carrying the end coded data for onward transmission or recording.

The data rate of encoded data is such that after recording by the above described technique, the data maybe recovered because it will lie within the bandwidth of the video recording method employed, this is not the case with broadcast Teletext.

Particular attention is given to the isolation and screening techniques used to separate the data signal from the video signal so that the video signal remains substantially unaffected by the incorporation of the data. This is important since the interpretation of the video signals is intended to be facilitated by the additional information, and video surveillance frequently takes place in less than ideal conditions so that picture quality degradation even by the smallest amount is to be avoided. By using standard composite video parameters in the circuit it is possible to ensure compatibility with many existing video camera and video recording instruments. In this way the end user may be provided with freedom of choice from the majority of commercially available such instruments.

The encryption unit 13 may itself be formed so that it can be used both for the transmission of encrypted video signals and for decoding received encrypted video signals, in which case separate transmitter and receiver units will effectively be combined in one. As can be seen in FIGURE 1 the encryption unit 13 is provided with a monitor display screen 22 and a keyboard 23 as an operator interface. Interactive keypads in place of a conventional keyboard may be employed in order to minimize the number of keys.

By utilizing the technique of encrypting data on the free lines available on the vertical retrace interval it is possible to accommodate data which would normally be carried on separate cables or radio frequency channels. This has the advantage in some situations (for example on underwater roving camera vehicles) in which the video signal is transmitted via an umbilical cable, with data on other cables, that these other cables may be eliminated thereby obtaining savings on mass and inertia of the system. This will clearly enhance the flexibility and durability of such operations.

Likewise, if channel allocations of radio frequency transmitted data links may be reduced, it is possible to employ more comprehensive monitoring and data retrieval techniques.

What is claimed is:

1. A signal processing apparatus for use with a video camera having a physical status said processing apparatus comprising:

means for generating data signals representing the physical status of the video camera with respect to a fixed frame of reference;

means for receiving video signals from the camera;

means for combining said data signals with said video signals to produce a composite signal by which data information and video information contained in said video signals can be displayed simultaneously but wherein said data information and said video information are substantially distinguishable with said video information being substantially unaffected by the incorporation of said data signals; and said signal processing apparatus further comprising data encryption means wherein said data signals are digitally encrypted by said data encryption means and incorporated in said video signals using a frame flyback period thereof, and further comprising means for determining a suitable free period in said flyback period for incorporating said data signals in order to avoid corrupting said video signals when combining said data signals and said video signals, said means for determining said suitable free period being operable to test an analogue signal level of a portion of said video signals within said flyback period and to compare said level with a known base level to determine if data information is stored in said portion of the flyback period.

2. The signal processing apparatus of claim 1, wherein said means for combining said data signals with said video signals to produce said composite signal includes a microprocessor programmed to assemble data signals representing position, altitude and motion parameters of the camera systematically in a predetermined order prior to incorporation of said data signals with said video signals.

3. The signal processing apparatus of claim 2, wherein said means for combining said data signals with said video signals includes digitizing means operable to digitize said data signals prior to encryption thereof by said data encryption means.

4. The video camera of claim 1, wherein there are further provided means for generating date and time signals and means for incorporating these latter with said data signals in said video signal produced by said camera.

5. Playback apparatus for use with the signal processing apparatus of claim 1, having decoder means operable to extract said data signal information from said composite signal and to present it for display as a visual overlay to said video information.

6. The playback apparatus of claim 5, further including receiver means for receiving transmitted video and data signals.

7. The signal processing apparatus of claim 1 wherein said determining means first checks to determine if any teletext signals are included in said video signals before passing on to determine other suitable periods into which said data signals may be incorporated.

8. A signal processing apparatus for a video camera having a physical status comprising means for generating data signals representing the physical status of the video camera with respect to a fixed frame of reference, means for receiving video signals from said camera, means for combining said data signals with said video signals whereby to produce a composite signal by which data information and video information contained in said video signals can be displayed simultaneously but wherein said data information and said video information are substantially distinguishable with said video information being substantially unaffected by the incorporation of said data signals, data encryption means wherein said data signals are digitally encrypted by said data encryption means and incorporated in said video signals using a frame flyback period, and means for determining a suitable free period in said flyback period for incorporating said data signals in order to avoid corrupting said video signals when combining said data signals and said video signals.

9. The signal processing apparatus of claim 8, wherein said means for combining said data signals with said video signals to produce said composite signal includes a microprocessor programmed to assemble data signals representing position, altitude and motion parameters of the camera systematically in a predetermined order prior to incorporation of said data signals with said video signals.

10. The signal processing apparatus of claim 9, wherein said means for combining said data signals with said video signals includes digitizing means operable to digitize said data signals prior to encryption thereof by said data encryption means.

11. A video camera for tele-surveillance purposes, said camera being provided with means including broadcast navigational signal receiver and decoder means operating to generate data signals representing a physical position of said camera with respect to a fixed frame of reference, and means for combining said data signals with video signals produced by said camera in such a way that data information and video information are substantially distinguishable with said video information in said video signals being substantially unaffected by said data signals, data encryption means wherein said data signals are digitally encrypted by said data encryption means and incorporated in said video signals using a frame flyback period, and means for determining a suitable free period in said flyback period for incorporating said data signals in order to avoid corrupting said video signals when combining said data signals and said video signals.

12. The video camera of claim 11, wherein there are further provided means for generating date and time signals and means for incorporating said date and time signals with said data signals in said video signal produced by said camera.

13. A playback apparatus for use with the signal processing apparatus of claim 8, further comprising decoder means operable to extract said data signal information from said composite signals and to present it for display as a visual overly to said video information.

14. A playback apparatus for use with said camera of claim 11, further comprising decoder means operable to extract said data signal information from said composite signal and to present it for display as a visual overlay to said video information.

15. The playback apparatus of claim 13, further including receiver means for receiving transmitted video and data signals.

16. The playback apparatus of claim 14 further including receiver means for receiving transmitted video and data signals.

17. In combination:

a signal processing apparatus comprising:

means for generating data signals representing a physical status of a video camera with respect to a fixed frame of reference, means for receiving video signals from said camera, means for combining said data signals with said video signals whereby to produce a composite signals by which data information and video information contained in said video signals can be displayed simultaneously, wherein said data information and said video information are substantially distinguishable with said video information being substantially unaffected by the incorporation of said data signals, data encryption means wherein said data signals are digitally encrypted by said data encryption means and incorporated in said video signals using a frame flyback period, and means for determining a suitable free period in the flyback period for incorporating said data signals in order to avoid corrupting said video signals when combining said data signals and said video signals, and a playback apparatus having decoder means operable to extract said data signal information from said composite signal and to present it for display as a visual overly to said video information.

18. In combination:

a video camera for tele-surveillance purposes, said camera comprising:

means including a broadcast navigational signals receiver and a decoder means operating to generate data signals representing a physical position of said camera with respect to a fixed frame of reference, and means for combining said data signals with video signals produced by said camera in such a way that data information and video information are substantially distinguishable with said video information being substantially unaffected by said data signals and further comprising data encryption means wherein said data signals are digitally encrypted by said data encryption means and incorporated in said video signals using a frame flyback period, and means for determining a suitable free period in said flyback period for incorporating said data signals in order to avoid corrupting said video signals when combining said data signals and said video signals; and a playback apparatus having decoder means operable to extract said data signal information from said composite signal and to present it for display as a visual overlay to said video information.

* * * * *

UNITED STATES PATENT AND TRADEMARK OFFICE
CERTIFICATE OF CORRECTION

PATENT NO. : 5,508,736
DATED : April 16, 1996
INVENTOR(S) : Roger D. Cooper

It is certified that error appears in the above-indentified patent and that said Letters Patent is hereby corrected as shown below:

Column 8, Claim 13, Line 20, delete "overly" and insert --overlay--;

Column 8, Claim 17, line 40, delete "signals" and insert --signal--;

Column 8, Claim 17, line 58, delete "overly" and insert --overlay--

Signed and Sealed this

Twenty-ninth Day of October 1996

Attest:

BRUCE LEHMAN

*Attesting Officer*  *Commissioner of Patents and Trademarks*